Nov. 7, 1939.　　　D. T. HAMILTON　　　2,179,230

GEAR GENERATING TOOL

Original Filed April 17, 1934　　2 Sheets-Sheet 1

Inventor
Douglas T. Hamilton
by Wright, Brown, Quinby & May
attys.

Nov. 7, 1939.   D. T. HAMILTON   2,179,230
GEAR GENERATING TOOL
Original Filed April 17, 1934   2 Sheets-Sheet 2
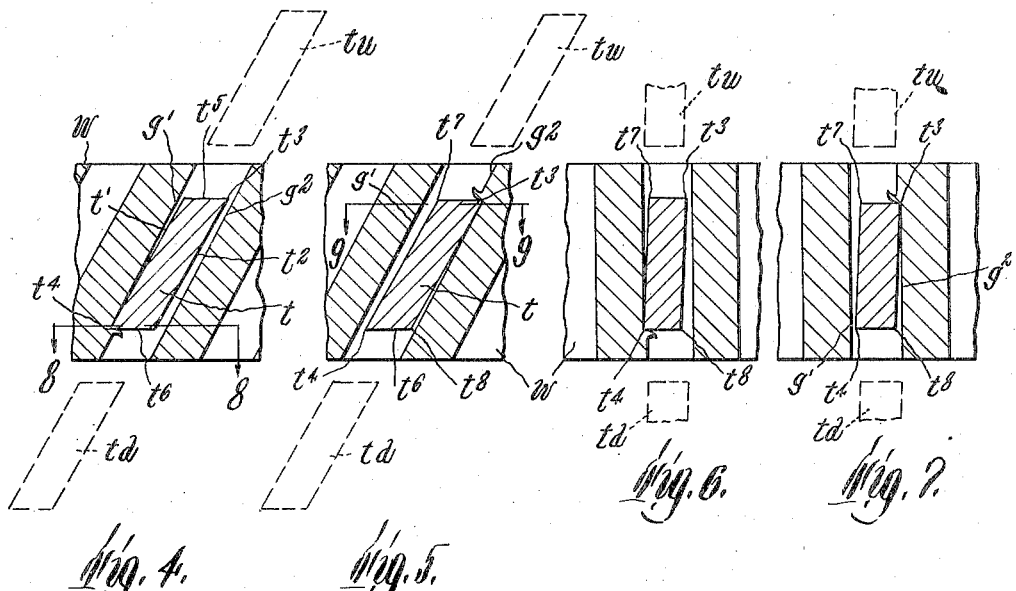
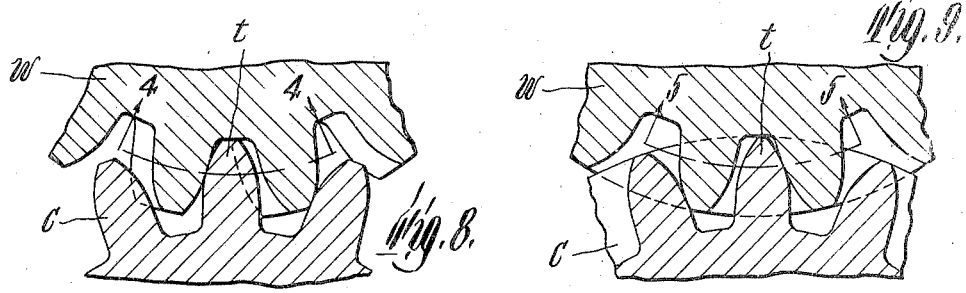
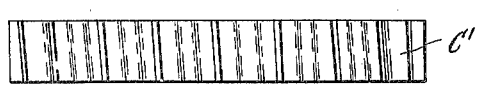
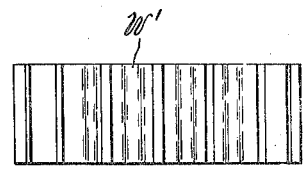
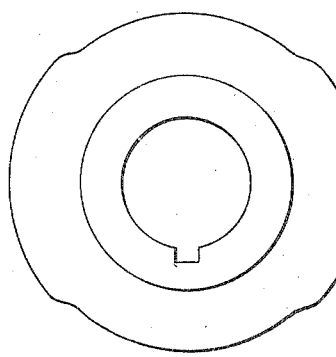
Inventor
Douglas T. Hamilton Patented Nov. 7, 1939

2,179,230

UNITED STATES PATENT OFFICE 2,179,230

GEAR GENERATING TOOL

Douglas T. Hamilton, Springfield, Vt., assignor to The Fellows Gear Shaper Company, Springfield, Vt., a corporation of Vermont Original application April 17, 1934, Serial No. 720,954. Divided and this application February 4, 1936, Serial No. 62,282

2 Claims. (Cl. 29—95)

This invention relates to the art of generating and cutting gears by the agency of a cutter equipped with peripheral teeth of which the outlines are similar to the outlines of gear teeth and the cutting edges are provided at the intersections of the sides of such teeth with planes, transverse to the axis of the cutter, which define the ends of the teeth. Such cutters as heretofore made have been of unlike characteristics at opposite ends because of the necessity of providing cutting clearance. That is, the opposite sides of each tooth have been convergently inclined toward one another away from the cutting end. Thus the cutting end of the tooth is the larger end and its contact with the work is limited to the cutting edges, as is required for doing satisfactory work. Such cutters, when dull, are sharpened by grinding off the face at the large end; which causes the teeth eventually to become progressively narrower, owing to the clearance inclinations of their opposite faces. Compensation for such reduction in width must then be made in order that the teeth may be cut with standard, or prescribed, width in the work. When a cutter of involute tooth formation is used for cutting involute gears, this compensation may be made by shortening the center distance between cutter and work; but this is not possible in cutting teeth of other forms or in cutting some classes of gear elements even with an involute cutter.

Another mode of compensation which is available for cutting teeth and analogous lobes or projections of all profiles or outlines, is disclosed in the patent to Edward W. Miller, No. 1,802,181, April 21, 1931, and comprises turning the cutter from side to side, between cutting strokes, a distance equal to the difference between the width of the cutter tooth and the width of the space required to be generated in the work, so as to cut alternately on opposite side edges of each tooth. This procedure avoids the difficulties consequent on changing the center distance, but as the cutter used therein has edges on one end only, it requires more time for completion of the work, other things being equal, than is required when both sides of a full width cutter tooth act at once.

Cutters which embody the present invention are designed to be used with angular movements about their axes after each stroke according to the principle of the above named patent, but are provided with cutting edges at opposite sides of their teeth and at relatively opposite sides of such opposite ends. Their use shortens the time element in comparison with said patent, as they cut during every stroke in each direction instead of returning idly on alternate strokes.

The invention also contemplates improvements in cutters adapted for operation on helical gears. The teeth of such cutters have heretofore always been made with convergent sides for clearance, as well as being generally helical in complement to the gears to be produced. Their opposite sides are therefore of different helical leads. They are usually sharpened in planes or lines normal to the median helices of the teeth, in order to make the clearance angles equal on both sides. Difficulties of no small magnitude are involved in producing such helical cutters with tooth face curvatures such that edges which are formed by substantially normal intersecting planes will yet generate tooth curves in the work which are of the correct form in planes perpendicular to the axis of the work. And the sharpening of such helical cutters involves a separate operation for each tooth and indexing of the cutter between sharpening operations.

The object and accomplishment of the present invention has been to provide a cutter having adequate clearance angles on both sides of its teeth, but of which the teeth are of uniform dimensions in all planes perpendicular to its axis, whereby no change of tooth dimensions (other than length in the axial direction) results from sharpening; which can be sharpened on both ends, and all the teeth of which can be sharpened in a continuous grinding operation whether the cutter is designed for generating straight gears or helical gears; and one which can be made at a lower cost than gear shaper cutters heretofore produced. A related object, which is accomplished by realization of the foregoing objects, is to avoid any change in the relationship of the cutter to the work in consequence of sharpening.

The invention claimed herein is a novel gear shaper cutter having the characteristics hereinbefore referred to and more fully described in the following specification. This subject matter was originally disclosed in my prior copending application filed April 17, 1934, Serial No. 720,954, of which the present application is a division. All of the principles and novel features which constitute the invention are intended to be protected in a scope covering externally toothed cutters adapted to generate or form external or internal gears and similar machine elements with straight or helical teeth, and internally toothed cutters for generating or forming either helical or straight toothed external gears and the like.

In the drawings which accompany this specification,—

Figure 1:
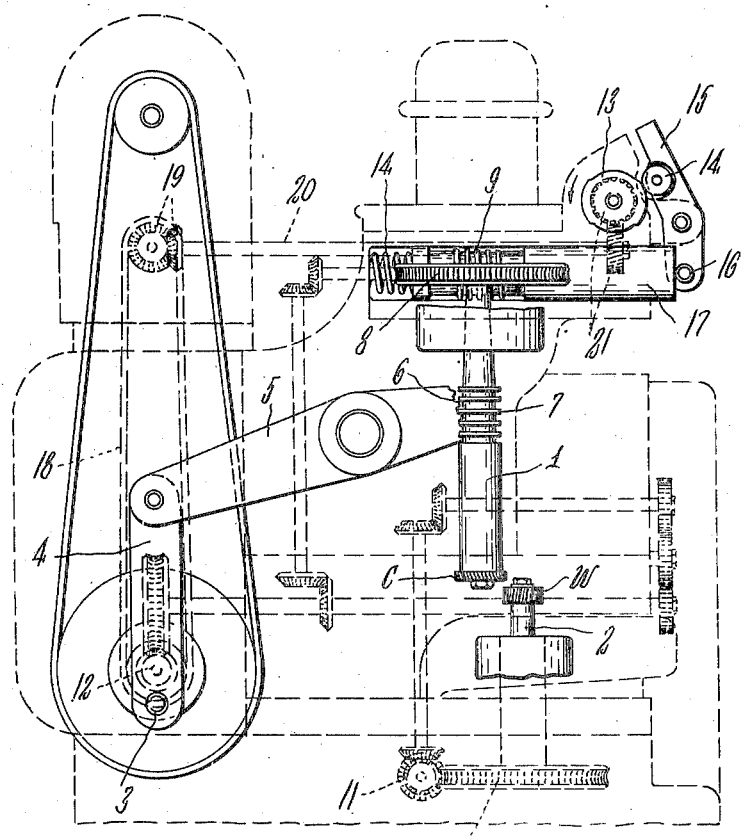
Fig. 1 is a diagrammatic view illustrating the general principles of a machine suitable for shaping gears with the aid of my novel cutter.
Figure 2:
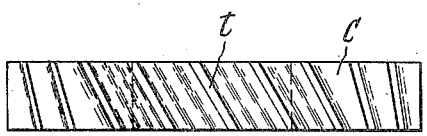
Fig. 2 is a side elevation of the invention embodied in a cutter designed to generate helical gears.
Figure 3:
Fig. 3 is a similar view of a gear generated by the cutter shown in Fig. 2.

Figs. 4 and 5 are diagrammatic views showing the alternate action, on its opposite strokes, of a cutter designed for generating helical gears, being represented as sectional views taken respectively on lines 4—4 of Fig. 8, and 5—5 of Fig. 9;

Figs. 6 and 7 are views similar to Figs. 4 and 5 respectively, showing the action of an equivalent cutter designed to generate the teeth of straight spur gears, or equivalent internal gears;

Figs. 8 and 9 are fragmentary sectional views, in planes perpendicular to their axes, of a cutter in action upon a helical gear; the planes in which such sections are taken being indicated by the lines 8—8 of Fig. 4, and 9—9 of Fig. 5, respectively;

Fig. 10 is a side elevation of a cutter made according to the principles of this invention for cutting gears with straight teeth;

Fig. 11 is an elevation of a gear generated by the cutter of Fig. 10;

Fig. 12 is an outline view of a form of cam suitable to effect the increment oscillation of the cutter which causes its teeth to act on alternately opposite sides during strokes in opposite directions.

Like reference characters designate the same parts wherever they occur in all the figures.

In these figures, the letter C designates the novel cutter of this invention designed for generating helical gears, and C' (Fig. 10) designates an equivalent, interchangeable cutter designed for generating gears with straight teeth. W is an illustrative helical gear produced by the cutter C; and W' (Fig. 11) an illustrative spur gear produced by the cutter C'. In preparation for carrying out the gear cutting operation, the cutter is mounted on one end of a cutter spindle 1, and the work piece on a work spindle 2. One of these spindles is then reciprocated endwise while both are rotated simultaneously in such directions and speeds as to give relative rotational effects to the cutter and work similar to those of a pair of mating gears running in mesh with one another.

The opposite side faces of the cutter teeth are outlined with the same curvature (in all planes perpendicular to the axis of the cutter) as the teeth of a standard gear in any desired system of gearing, or any outline conjugate or complemental to the forms desired to be cut in the work. That is, if involute gears are to be made, the cutter tooth faces are involute curves; or for cutting cycloidal gears they are cycloidal curves, etc. They may also be modified from standard curvature, if desired, according to principles heretofore known and described in prior patent, to cause quiet meshing of the gears which are made by their use. These teeth, however, are narrower on the operating pitch circumference than the tooth spaces designed to be cut in the work pieces (and also narrower than the spaces between them on the same circumference, in the case of cutters designed to finish standard gears and the like of which the teeth and spaces have substantially the same width on the operating pitch circumference), wherefore they cut by the edges at one side only of their teeth at a time.

All the cutters embodying the invention whether made for cutting in straight or helical paths, differ from the gear shaper cutters hitherto used in that their teeth are exactly uniform as to dimensions and outlines in all planes perpendicular to the axis of the cutter, and are sharpened at both ends. The teeth of all, even those for cutting straight toothed gears, are helical; but the helix angles of both side faces are equal and of the same hand. That helix angle, in the case of cutters designed for making straight toothed gears, is only the amount of the clearance angle, and may be as small as one degree from a line parallel to the axis; and, of course, may be slightly or considerably greater. In the case of cutters for helical gears, it is the helix angle complemental to that of the gear to be cut plus or minus a suitable clearance angle. In terms of helical lead (which is the axial distance between successive convolutions of a helix, and is a constant for a given regular helicoidal surface at all distances from the axis of the helicoid), the lead of the cutter teeth is shorter than that of the teeth to be generated.

Referring to the helical cutter shown in Figs. 2, 4, 5, 8 and 9, each tooth $t$ has helicoidal side faces $t'$ and $t^2$, which are equidistant from one another at corresponding points in all planes perpendicular to the cutter axis, and has cutting edges $t^3$ and $t^4$ formed respectively by the intersection of the end face $t^5$ with the side face $t^2$, and the intersection of the end face $t^6$ with the side face $t'$. The helix angles of the faces $t'$ and $t^2$ are equal to the helix angles of the gear tooth faces $g'$ and $g^2$ of the work piece, minus the clearance angle of one degree (more or less). Hence the cutting edge $t^3$ is the only part of the cutter tooth capable of engaging the gear tooth face $g^2$, and the edge $t^4$ is the only part of the cutter tooth which can engage the gear tooth face $g'$.

In the course of the downward stroke of the cutter (considered with respect to Figs. 4 and 5), tooth $t$ is brought so that its edge $t^4$ cuts the face $g'$ of the work piece; and corresponding edges of other cutter teeth act upon relatively corresponding parts of other teeth of the work piece, while all other parts of the cutter are out of contact. When the cutter has been carried clear of the work, as shown by the dotted line position $td$, it is given a slight incremental rotation about its axis sufficient to bring the cutting edge $t^3$ into action on the face $g^2$ of the work; and it cuts on the following up stroke, while edge $t^4$ is shifted clear of the face $g^2$. Arriving at the upper position $tu$, the cutter is shifted incrementally to the opposite side, and the edge $t^4$ comes into action again on the next down stroke.

Thus on each down stroke, the cutter acts through one edge only of its operative teeth at the lower end thereof, and on each up stroke it acts by means of the opposite edge at the upper end of the tooth. All of the cutter teeth which have penetrated into the work piece act in essentially this manner; while different teeth are successively coming into and out of action by virtue of the continuing generating rotation.

The cutters for making straight teeth operate in exactly the same way. Their only difference from helical gear cutters is in the helix angle of their teeth. This is made plain by comparison of Fig. 10 with Fig. 2, and of Figs. 6 and 7 with Figs. 4 and 5 respectively. Accordingly I have designated the cutting edges of the tooth shown in Figs. 6 and 7 by the same reference characters as those used in Figs. 4 and 5. A general statement applicable to both types of cutter and both modes of gear cutting herein described is this:—The helical leads of opposite sides of the respective cutter teeth are equal to one another, and are shorter than the lead of the path in which the cutter teeth travel in cutting, by an amount sufficient to provide the desired side clearance. The straight line path in which the cutter moves when finishing straight spur gears is here considered as one having a lead of infinite length.

It will be noted that in every case the cutting edges are acute angles, and that the obtuse angle edges between the side and end faces of the teeth are not brought into action at all. This makes it unnecessary to sharpen the teeth of the helical cutter in such a way as to form an acute angle edge at the corners designated $t^7$ and $t^8$. Thus the cutters may be sharpened by grinding off the end face in a continuous sweep, either in planes square to the axis, or on a dished conical or spherical surface, if desired, for additional top rake. If the angle at the edges $t^3$ and $t^4$ is so sharp as to leave insufficient strength at these edges, the end faces $t^5$ and $t^6$ may be beveled in known manner.

Gear shaping machines by which my cutters may be operated with the effect above described are already in existence and are disclosed in the before mentioned Miller Patent No. 1,802,181. I have illustrated herein the principles of said patented machine, in a diagrammatic way by Fig. 1. Typical means for reciprocating the cutter spindle 1 are designated by a crank pin 3 acting through a link 4, rocker arm 5, gear segment 6, and rack teeth 7 encircling the spindle in mesh with said segment. Means for rotating the cutter and work spindles in harmony with one another are typified by a worm gear 8 on the cutter spindle in mesh with a worm 9, a worm gear 10 on the work spindle in mesh with a worm 11, and transmission gearing and shafts between these two worms and the main shaft 12. An operative train of such mechanism, including changeable gears for varying the speed ratio, in the train of the work spindle drive, are indicated by broken lines.

The side movements of the cutter, previously described as shifting its active teeth between cutting positions at alternately opposite sides, are effected by incremental oscillations superimposed upon the normal rotation of the cutter spindle. These oscillations may be caused by shifting the worm 9 endwise in alternately opposite directions by a cam 13 and a spring 14 respectively; the cam acting through a lever 15 and a stud 16 carried thereby against the end of the worm shaft, and the spring reacting against an opposed abutment on the frame structure. The cam is shown as being driven from the main shaft by chain 18, gearing 19, shaft 20, and gearing 21 in proper timing with the reciprocations of the spindle so that the cutter is shifted with the effect previously described at the times when it is clear of the work. It is to be understood that the directions of these lateral incremental movements are relative to the rotation and positions of the work, and not absolute. That is, the shift of the cutter in one direction may be a temporary retardation or arrest of its normal rotation rather than a reversal of such rotation.

In cutting straight toothed gears, the cutter spindle has only the movements of reciprocation, rotation, and incremental oscillation above described; and rotation is transmitted to it from the driving gear 8 through guides which permit endwise sliding movement and have contact faces parallel with the axis. But for cutting helical gears, the cutter has still another oscillative movement, in relatively opposite directions on opposite strokes, effected by making such guides of helical formation with such a lead that the paths of the active cutter teeth conform with the helix angle of the gear teeth to be produced. The principles and essential characteristics of guides suitable for this purpose which I employ are shown in the patent to E. R. Fellows, No. 676,227, June 11, 1901.

The same cutter principles are applicable also to internally toothed cutters for forming externally toothed elements in the manner disclosed by the patent to E. W. Miller No. 1,953,969, April 10, 1934, and for making conjugate external teeth by the molding generating process. Internal cutters thus modified have the same characteristics before described of helical teeth with equal lead and of the same hand on both sides, end faces substantially or nearly parallel to one another and perpendicular to the cutter axis, and cutting edges at the acute-angle intersections of both end faces and the opposite side faces of all the teeth.

Such cutters, external as well as internal, are useful particularly for finishing gears and the like which have previously been cut to a more or less close approximation to prescribed dimensions but have a certain amount of material still to be removed.

Nothing in the foregoing description of typical operating means is to be construed as limiting the use of the new invention to that situation only wherein the cutter is reciprocated and incrementally oscillated. On the contrary, the invention is equally applicable to situations where all of these motions are imparted to the work spindle, or they are shared between the cutter and work spindles.

What I claim and desire to secure by Letters Patent is:

1. A cutter of the gear shaper type having a geometrical axis and teeth arranged in a series surrounding said axis, the corresponding end faces of all the teeth being in the same surface of revolution substantially perpendicular to the said axis, and the opposite end faces of all the teeth being in another surface of revolution also substantially perpendicular to said axis, the opposite side faces of each tooth having helical curvature of the same lead, and the acute angle intersections of said side faces with the end faces forming cutting edges, the width of the teeth on the operating pitch circumference of the cutter being less than the corresponding width of the spaces to be cut in the work.

2. A gear finishing cutter having helical teeth arranged in a curved series surrounding an axis, with their end faces substantially perpendicular to said axis, each tooth being of equal width in all planes perpendicular to the axis, and their width on the operating pitch circumference of the cutter being less than the width of the spaces to be cut in the workpiece, and the acute angle intersections of the side and end faces of the teeth being cutting edges.

DOUGLAS T. HAMILTON.